(12) United States Patent
Chinn (10) Patent No.: US 11,352,777 B2
(45) Date of Patent: Jun. 7, 2022

(54) EXPANDABLE SHELTER ASSEMBLY (71) Applicant: Kevin Francis Chinn, Rex, GA (US)

(72) Inventor: Kevin Francis Chinn, Rex, GA (US)

( * ) Notice: Subject to any disclaimer, the term of this patent is extended or adjusted under 35 U.S.C. 154(b) by 12 days.

(21) Appl. No.: 16/895,866

(22) Filed: Jun. 8, 2020

(65) Prior Publication Data

US 2020/0392722 A1 Dec. 17, 2020

Related U.S. Application Data

(60) Provisional application No. 62/860,904, filed on Jun. 13, 2019.

(51) Int. Cl.
*E04B 1/343* (2006.01)
*E04B 1/344* (2006.01)
*B60P 3/36* (2006.01)
*E04H 15/00* (2006.01)

(52) U.S. Cl.
CPC ........ *E04B 1/34357* (2013.01); *E04B 1/3445* (2013.01); *B60P 3/36* (2013.01); *E04H 15/008* (2013.01)

(58) Field of Classification Search
CPC ...... E04B 1/34357; E04B 1/3445; B60P 3/32; B60P 3/34–341
See application file for complete search history.

(56) References Cited

U.S. PATENT DOCUMENTS

| 1,471,508 A | | 10/1923 | Spanger | |
|---|---|---|---|---|
| 3,288,520 A | * | 11/1966 | Krutzikowsky | B60P 3/341 296/170 |
| 3,622,193 A | * | 11/1971 | Schmidt | B60P 3/34 296/164 |
| 3,752,349 A | | 8/1973 | Rana | |
| 3,768,855 A | * | 10/1973 | Laue | B60P 3/34 296/26.02 |
| 3,796,342 A | * | 3/1974 | Sanders | B65D 11/1826 220/6 |
| 4,165,117 A | * | 8/1979 | Kaiser | B60P 3/34 296/169 |

(Continued)

FOREIGN PATENT DOCUMENTS

| EP | 1316509 A1 | 6/2003 |
|---|---|---|
| EP | 1136376 B1 | 11/2004 |
| JP | 5685786 B1 * | 3/2015 |

*Primary Examiner* — Babajide A Demuren (57) ABSTRACT

An expandable shelter assembly that includes a covering hinge coupled to an expandable frame and a base hinge coupled to the expanding frame opposite the covering. The expandable frame is a hollow quadrilateral structure that includes a plurality of sides. The expandable frame includes a collapsed state and a deployed state. When collapsed, the expandable frame is collapsed and the cover is positioned proximate to the base. When deployed, the expandable frame is expanded and the cover is positioned distal to the base. Each side of the expandable frame is insulated, collapsible; includes a first panel hinge coupled to a second panel; and folds inward when the expandable frame is in the collapsed state. The covering and the base are each complementary in shape compared to the expandable frame. The covering is a rigid structure that partially encloses the expandable frame. The base is a hollow and rigid frame.

14 Claims, 7 Drawing Sheets

(56) References Cited

U.S. PATENT DOCUMENTS

| | | | | |
|---|---|---|---|---|
| 4,201,413 A * | 5/1980 | Rowe | | B60P 3/34 |
| | | | | 296/165 |
| 6,325,447 B1 * | 12/2001 | Kuo | | B60P 3/341 |
| | | | | 296/160 |
| 6,565,143 B2 * | 5/2003 | Okamoto | | B60P 3/341 |
| | | | | 296/156 |
| 6,840,436 B2 | 1/2005 | Wang | | |
| 7,090,286 B1 * | 8/2006 | Foreth | | B60P 3/341 |
| | | | | 296/173 |
| 10,960,743 B2 * | 3/2021 | Sauvlet | | B60J 7/165 |
| 10,985,689 B2 * | 4/2021 | Wickramasekera | | H01L 31/042 |
| 11,110,846 B2 * | 9/2021 | Thompson | | B60P 3/34 |
| 2010/0186309 A1 * | 7/2010 | Hawkins | | E04B 1/3445 |
| | | | | 52/79.5 |
| 2012/0152963 A1 * | 6/2012 | Scott | | A45C 5/02 |
| | | | | 220/592.25 |
| 2017/0096825 A1 * | 4/2017 | Bree | | B29C 45/40 |
| 2017/0335561 A1 * | 11/2017 | Wickramasekera | | B60P 3/34 |

* cited by examiner

EXPANDABLE SHELTER ASSEMBLY

CROSS-REFERENCE TO RELATED APPLICATIONS

This application claims priority to U.S. Provisional Application No. 62/860,904 filed Jun. 13, 2019, which is hereby incorporated herein by reference.

FIELD OF THE INVENTION

The present disclosure relates generally to shelter assemblies. More specifically, the present disclosure describes expanding shelter assemblies.

BACKGROUND OF THE INVENTION

Shelters are basic architectural structures or buildings that provide protection from the local environment. Shelters can be mobile (e.g., campers), stationary (e.g., buildings), permanent, or temporary (e.g., tent). Shelters can be small buildings or covered places that protect people from, for example, bad weather or danger. Pop-up tents, for example, are portable tents that are easy to assemble while pop-up campers are typically a type of towed recreational vehicle that can be collapsed for easy storage and transport. Similarly, rooftop tents are tents that attach to a vehicle's roof rack and deployed by unfolding. Here, users refold the tent and, optionally, detach the item when not in use.

BRIEF DESCRIPTION OF THE DRAWINGS

Some of the embodiments will be described in detail, with reference to the following figures, wherein like designations denote like members, wherein.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. In the same vein, the term "distal" refers to the positioning of an object away from a specific object.

The present disclosure includes many aspects and features. Moreover, while many aspects and features relate to, and are described in the context of expanding shelter assemblies, embodiments of the present disclosure are not limited to use only in this context.

Shelters are basic architectural structures or buildings that provide protection from the local environment. Shelters can be mobile (e.g., campers), stationary (e.g., buildings), permanent, or temporary (e.g., tent). Shelters can be small buildings or covered places that protect people from, for example, bad weather or danger. Pop-up tents, for example, are portable tents that are easy to assemble while pop-up campers are typically a type of towed recreational vehicle that can be collapsed for easy storage and transport. Similarly, rooftop tents are tents that attach to a vehicle's roof rack and deployed by unfolding. Here, users refold the tent and, optionally, detach the item when not in use. The instant disclosure seeks to provide expanding shelter assemblies according to some embodiments.

Figure 1:
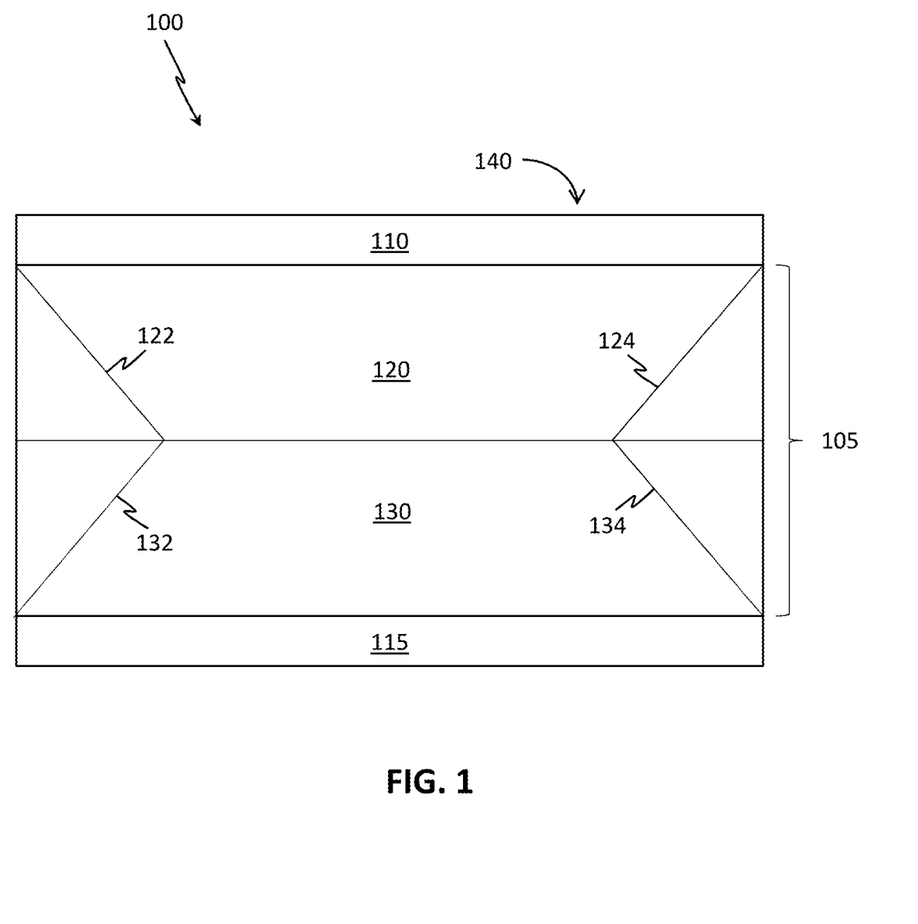
FIG. 1 depicts an expandable shelter assembly having an expandable frame positioned in a deployed state according to some embodiments.

FIG. 1 depicts an expandable shelter assembly, generally 100, that has an expandable frame 105 positioned in a deployed state 140 (discussed further below) according to some embodiments. The expandable shelter assembly 100 is a shelter can be configured to be any desired size (e.g., compartment sized, room sized, building sized). The expandable shelter assembly 100 is a structure that can reconfigure and change shape/size from folding and unfolding itself. The expandable shelter assembly 100 can be configured for vertical or horizontal attachment to a structure (e.g., buildings, vehicles, cars, trucks, vans, wall structures, boats, and similar rigid structures). For example, the expandable shelter assembly 100 can be affixed to structures and/or surfaces via fasteners.

Figure 3:
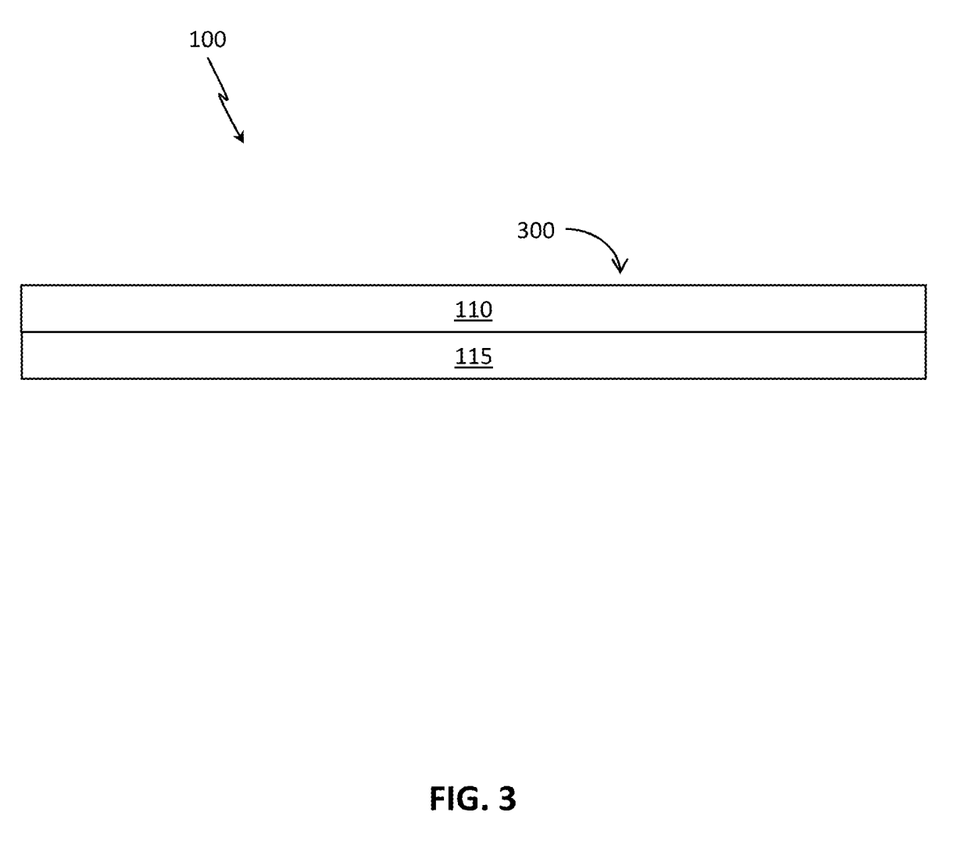
FIG. 3 depicts the expandable shelter assembly in the collapsed state according to certain embodiments.

The expandable shelter assembly 100 preferably includes the expandable frame 105, a covering 110 hinged coupled to the expandable frame 105, and a base 115 that is also hinge coupled to the expandable frame 105 opposite the covering 110. In preferred embodiments, the covering 110 and the base 115 each include composite material(s). Although other materials can be used, composited material usage allows for a reduction of the overall weight of the expandable shelter assembly 100, which can be benefit the construction, assembly, transportation, and/or maintenance of the expandable shelter assembly 100. The expandable frame 105 is preferably a hollow quadrilateral structure that forms the walls of the expandable shelter assembly 100. The expandable frame 105 has a collapsed state 300 (e.g., as depicted in FIG. 3) and a deployed state 140 according to preferred embodiments.

Here, in the collapsed state 300, the expandable frame 105 is collapsed (i.e. has assumed a minimum height or width, depending on its orientation) and the cover 110 is positioned proximate to the base 115. The cover 110 is a covering that is positioned on the expandable frame 105 and provides protection, concealment, and/or warmth to the expandable frame 105. The base 115 supports the expandable frame 105 according to some embodiments. In the deployed state 140, the expandable frame is expanded (i.e. has assumed a maximum height/width, depending on its orientation), and the cover 110 is positioned distal to the base 115 (as depicted in FIG. 1).

Figure 2:
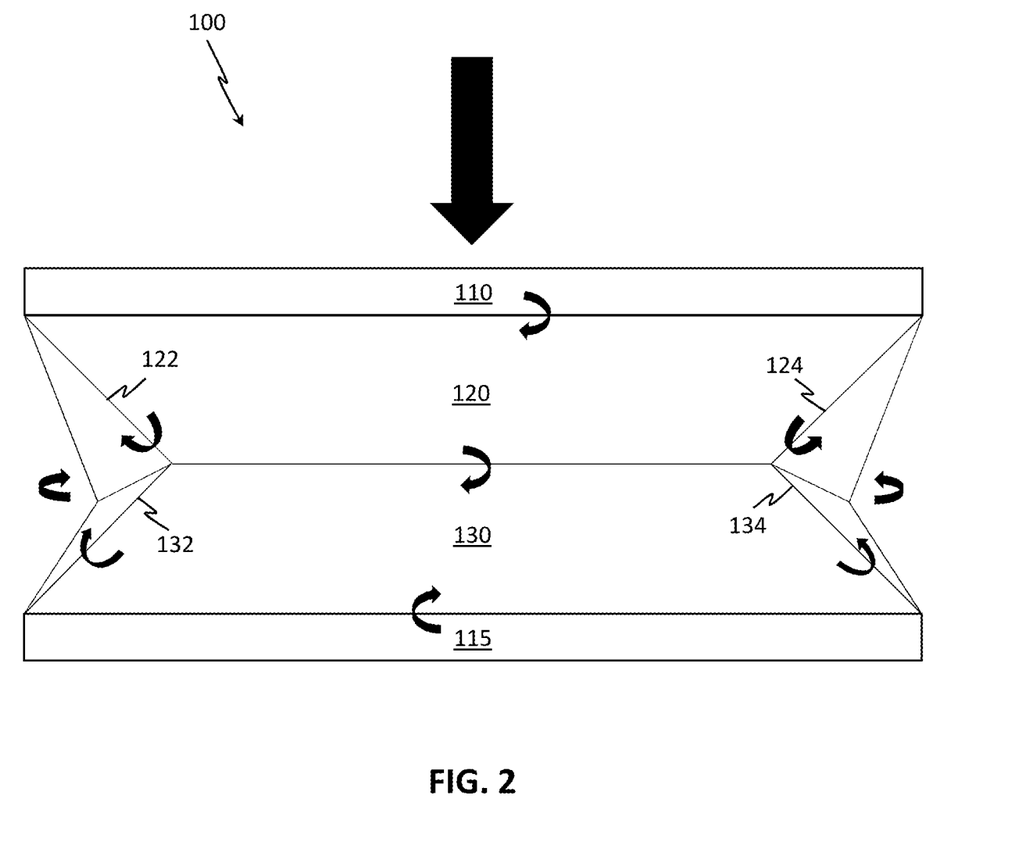
FIG. 2 depicts the expandable frame transitioning from the deployed state of FIG. 1 to a collapsed state according to other embodiments.

As the expandable frame 105 is preferably a hollow quadrilateral structure having a plurality of sides, each side thereof is collapsible and includes a first panel 120 hinge coupled to a second panel 130. FIG. 2 depicts the expandable frame 105 transitioning from the deployed state 140 to a collapsed state 300 (as depicted in FIG. 3) according to other embodiments. As depicted in FIG. 3, each of the aforementioned sides also fold inward when the expandable frame 105 is in the collapsed state 300. The covering 110 and the base 115 are each preferably complementary in shape compared to the expandable frame 105. The covering 110 is preferably a rigid structure that partially encloses the expandable frame 105. The base 115 is preferably a hollow and rigid frame that may or may not include flooring. The covering 110 and the base 115 can each include a window(s) or a door(s). The expandable shelter assembly 100 is insulated according to preferred embodiments.

The first panel 120 preferably includes a first crease 122 and further includes a second crease 124 that is positioned opposite the first crease 122. Here, the first crease 122 and the second crease 124 each diagonally traverse the first panel 120 (e.g., to facilitate its folding). The first crease 122 and the second crease 124 each extend from the covering 110 and terminate adjacent to the second panel 130. The first panel 120 folds along the first crease 122 and the second crease 124 when the expandable frame 105 is in the collapsed state 300. In certain embodiments, in the collapsed state 300, the expandable frame 105 is encapsulated by the cover 110 and the base 115 (e.g., as depicted in FIG. 3). In other embodiments, the expandable frame 105 is partially encapsulated by the cover 110 and the base 115 when the expandable frame 105 is the collapsed state 300.

In accordance with preferred embodiments, the second panel 130 includes a third crease 132 and further includes a fourth crease 134 positioned opposite the third crease 132. The third crease 132 and the fourth crease 134 each diagonally traverse the second panel 130 according to preferred embodiments. The third crease 132 and the fourth crease 134 each extend from the base 115 and terminate adjacent to the first panel 120. The second panel 130 folds along the third crease 132 and the fourth crease 134 when the expandable frame 105 is in the collapsed state 300.

Figure 4:
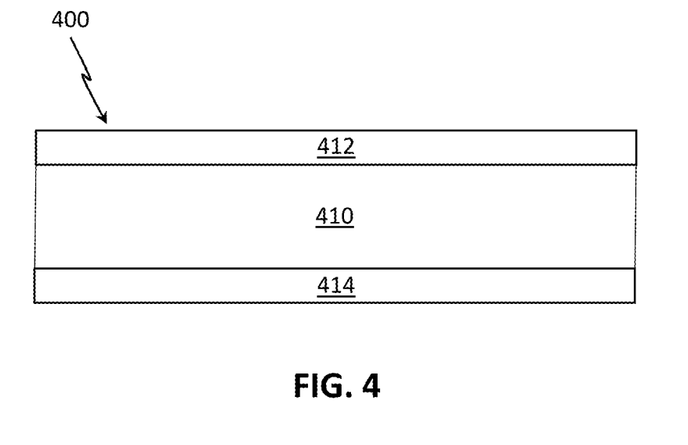
FIG. 4 depicts a closed-cell panel sandwiched between fabric according to yet still other embodiments.
Figure 5:
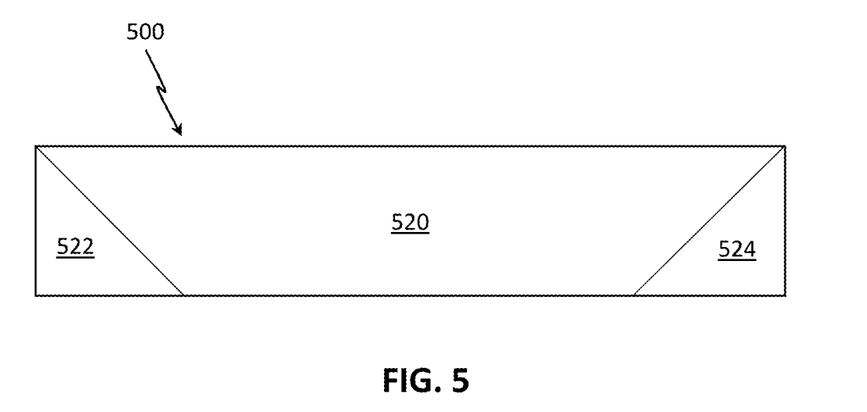
FIG. 5 depicts a panel that has several structural insulated panels according to some embodiments.

In some embodiments, the first panel 120 and the second panel 130 each include a closed-cell foam panel 410 (e.g., for structural support and insulation) that is sandwiched between fabrics 412 and 414 as reflected in FIG. 4. The fabric 412 and 414 are preferably marine-grade fabrics. As used herein, "marine-grade fabric" refers to fabric that is resistant to ultraviolet radiation, water, mold, and mildew. Hence, use of the marine-grade material allows the expandable shelter assembly to be used in challenging environments. In other embodiments, the first panel 120 and the second panel 130 each include an extruded polystyrene panel(s) that provide insulation (as well as structural support). While in yet still other embodiments, the first panel 120 and the second panel 130 each include at least one structural insulated panel (SIP) that also provides insulation and structural support. SIPs typically cannot be creased, which may require the use of several panels to support the folding mechanism of the instant disclosure. In embodiments that incorporate SIPs, a panel 500 (which can represent the first panel 120 or the second panel 130) preferably includes panel 522 hinge coupled to panel 520 at one end and panel 524 hinge coupled the panel 520 at the other. Here, the panel 522, the panel 520, and the panel 524 each include a SIP(s).

Figure 6:
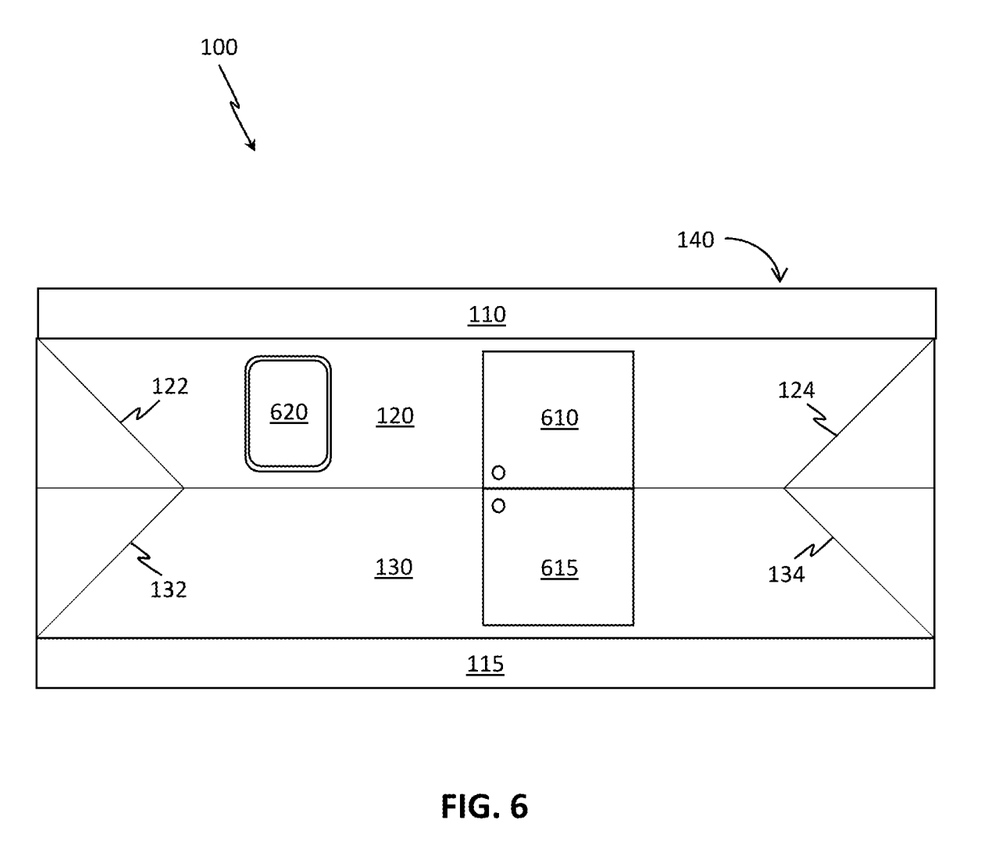
FIG. 6 depicts the expandable shelter assembly with a window and door sections included therein according to certain embodiments.

The expandable shelter assembly 100 can include one or more doors and/or windows. To access the expandable shelter assembly 100, access points (e.g., doors) can be included in the cover 110, the base 115, and/or a side(s) of the expandable frame 105. FIG. 6 depicts the expandable shelter assembly 100 with a window 620 and door sections 610 and 615 included therein according to certain embodiments. Here, the first panel 120 includes the window 620 and the door section 610 and the second panel 130 includes the door section 615. The door section 610 and the door section 615 together form a door that is divided into two parts horizontally, which allows each independent operation. Although depicted with a vertical orientation, the door section 610 and/or the door section 615 can be oriented horizontally.

Figure 7:
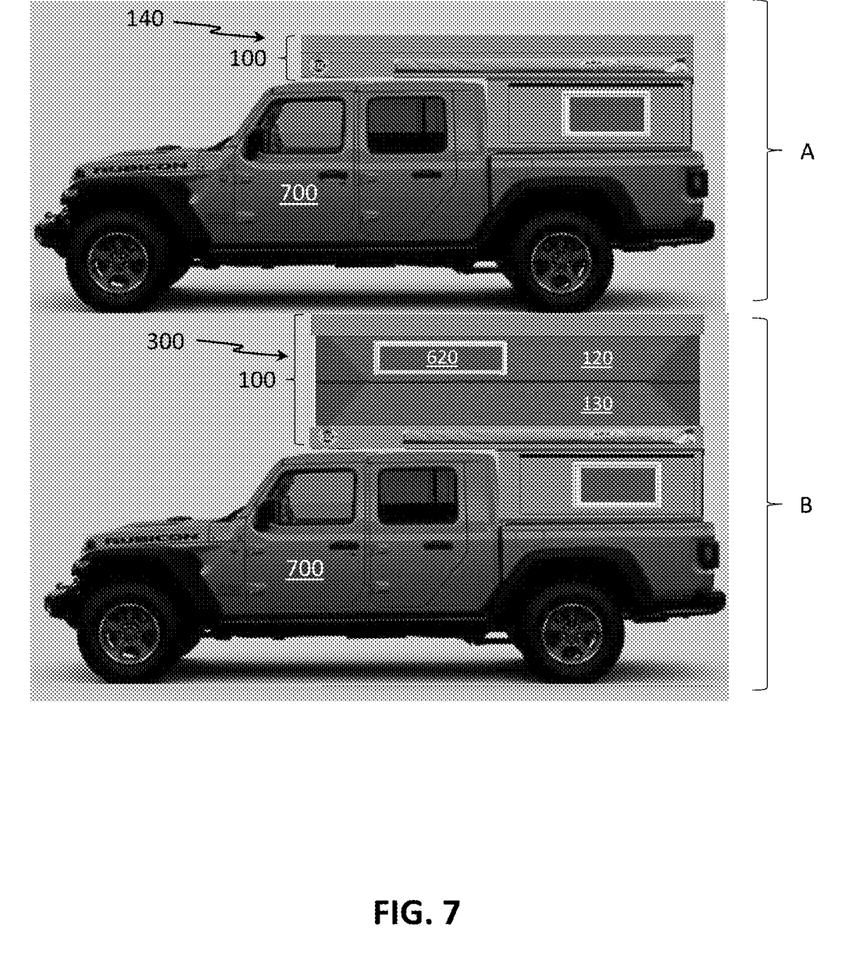
FIG. 7 depicts the expandable shelter assembly mounted on a vehicle according to some embodiments.

In other embodiments, either the first panel 110 or the second panel 130 comprises a door section. For example, the expandable shelter assembly 100 may only include the door section 615 positioned in the second panel 130. For example, the expandable shelter assembly 100 can be positioned on the ground, attached to a structure as an extension, or attached to a vehicle. FIG. 7 depicts the expandable shelter assembly 100 mounted on a vehicle 700 according to certain embodiments. Specifically, FIG. 7A depicts the expandable shelter assembly 100 with the expandable frame 105 in the collapsed state 140 and attached to vehicle 700. FIG. 7B depicts the expandable shelter assembly 100 with the expandable frame 105 in the expanded state 300 attached to the vehicle 700. In general, although not shown, users can gain access to the expandable shelter assembly 100 via the base 115 or an alternative side of the expandable shelter assembly 100 that includes a door section(s) or other opening(s).

Figure 8:
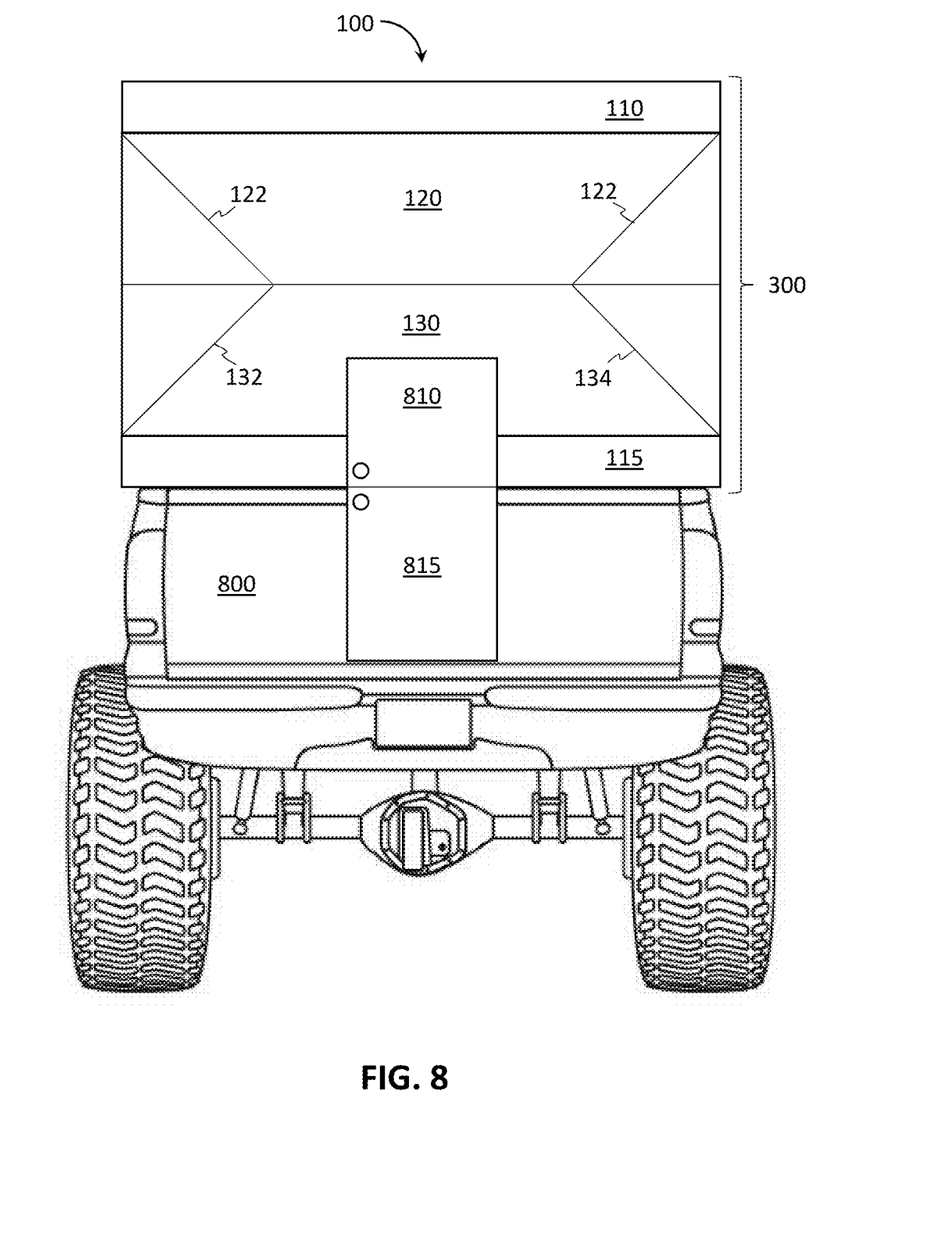
FIG. 8 depicts the expandable shelter assembly mounted on a vehicle according to other embodiments.

FIG. 8 depicts the expandable shelter assembly 100 mounted on a vehicle 800 according to other embodiments. The expandable shelter assembly 100 is positioned in the expanded state 300. Here, the expandable shelter assembly 100 is attached to the truck bed of the vehicle 800. The second panel 130 includes door section 130, which functions in a similar manner as the door section 610 and/or the door section 615. The door section 810 is positioned on the second panel 130 and extends to the base 115. Here, the door section 810 and the door section 815 allow users to access the expandable shelter assembly 100 and the truck bed.

Although the disclosure has been explained in relation to its preferred embodiment, it is to be understood that many other possible modifications and variations can be made without departing from the spirit and scope of the disclosure.

The invention claimed is:

1. An expandable shelter assembly, comprising:
   an expandable frame;
   a cover hinged to the expandable frame;
   a base hinged to the expandable frame opposite the cover;
   wherein
      the expandable frame is a hollow quadrilateral structure that comprises a plurality of sides;
      the expandable frame comprises a collapsed state and a deployed state;
      in the collapsed state, the expandable frame is collapsed and the cover is positioned proximate to the base;
      in the deployed state, the expandable frame is expanded and the cover is positioned distal to the base;
      each side of the expandable frame
         is collapsible;
         comprises a first panel hinged to a second panel;
         folds inward when the expandable frame is in the collapsed state;
            the first panel comprises a first crease and a second crease positioned opposite the first crease; the first crease and the second crease each diagonally traverse the first panel; the first crease and the second crease each extend from the cover and terminate adjacent to the second panel; the first panel folds along the first crease and the second crease when the expandable frame is in the collapsed state;
            the second panel comprises a third crease and a fourth crease positioned opposite the third crease;
            the third crease and the fourth crease each diagonally traverse the second panel;
            the third crease and the fourth crease each extend from the base and terminate adjacent to the first panel; and
            the second panel folds along the third crease and the fourth crease when the expandable frame is in the collapsed state;
      the cover and the base are each complementary in shape compared to the expandable frame;
      the cover is a rigid structure that partially encloses the expandable frame;
      the base is a hollow and rigid frame; and
      the expandable shelter assembly is insulated.

2. The expandable shelter assembly of claim 1, wherein the cover comprises a composite material.

3. The expandable shelter assembly of claim 2, wherein the base comprises a composite material.

4. The expandable shelter assembly of claim 3, wherein the first panel and the second panel each comprise:
   a closed-cell foam panel sandwiched between a fabric; and
   the fabric is a marine-grade fabric.

5. The expandable shelter assembly of claim 3, wherein the first panel and the second panel each comprise an extruded polystyrene panel.

6. The expandable shelter assembly of claim 3, wherein the first panel and the second panel each comprise a structural insulated panel.

7. The expandable shelter assembly of claim 3, wherein the first panel comprises a window.

8. The expandable shelter assembly of claim 3, wherein the first panel and/or the second panel comprise a door section.

9. An expandable shelter assembly, comprising:
an expandable frame that is a hollow quadrilateral structure that comprises a plurality of sides;
a cover that comprises a composite materials and is hinged to the expandable frame;
a base that comprises a composite materials and is hinged to the expandable frame opposite the cover;
wherein
the expandable frame comprises a collapsed state and a deployed state;
in the collapsed state, the expandable frame is collapsed and the cover is positioned proximate to the base;
in the deployed state, the expandable frame is expanded and the cover is positioned distal to the base;
each side of the expandable frame
is collapsible;
comprises a first panel hinged to a second panel;
folds inward when the expandable frame is in the collapsed state;
the first panel comprises a first crease and a second crease positioned opposite the first crease; the first crease and the second crease each diagonally traverse the first panel; the first crease and the second crease each extend from the cover and terminate adjacent to the second panel; the first panel folds along the first crease and the second crease when the expandable frame is in the collapsed state;
the second panel comprises a third crease and a fourth crease positioned opposite the third crease;
the third crease and the fourth crease each diagonally traverse the second panel;
the third crease and the fourth crease each extend from the base and terminate adjacent to the first panel; and
the second panel folds along the third crease and the fourth crease when the expandable frame is in the collapsed state;
the cover and the base are each complementary in shape compared to the expandable frame;
the cover is a rigid structure that partially encloses the expandable frame;
the base is a hollow and rigid frame; and
the expandable shelter assembly is insulated.

10. The expandable shelter assembly of claim 9, wherein the first panel and the second panel each comprise:
a closed-cell foam panel sandwiched between a fabric; and
the fabric is a marine-grade fabric.

11. The expandable shelter assembly of claim 9, wherein the first panel and the second panel each comprise an extruded polystyrene panel.

12. The expandable shelter assembly of claim 9, wherein the first panel and the second panel each comprise a structural insulated panel.

13. The expandable shelter assembly of claim 9, wherein the first panel comprise a window.

14. The expandable shelter assembly of claim 9, wherein the first panel and/or the second panel comprise a door section.

* * * * *